US008666606B2

(12) United States Patent
Cassar et al.

(10) Patent No.: US 8,666,606 B2
(45) Date of Patent: Mar. 4, 2014

(54) POWER STEERING DEVICE FOR AUTOMOBILE

(75) Inventors: Stephane Cassar, Lyons (FR); Jean-Marc Kasbarian, Lyons (FR)

(73) Assignee: JTEKT Europe (FR)

( * ) Notice: Subject to any disclaimer, the term of this patent is extended or adjusted under 35 U.S.C. 154(b) by 737 days.

(21) Appl. No.: 12/670,575

(22) PCT Filed: Jul. 10, 2008

(86) PCT No.: PCT/FR2008/001010
§ 371 (c)(1), (2), (4) Date: Sep. 24, 2010

(87) PCT Pub. No.: WO2009/034261
PCT Pub. Date: Mar. 19, 2009

(65) Prior Publication Data
US 2011/0035110 A1    Feb. 10, 2011

(30) Foreign Application Priority Data
Jul. 23, 2007  (FR) .................................... 07 05346

(51) Int. Cl.
*B62D 6/00* (2006.01)

(52) U.S. Cl.
USPC ................. 701/43; 701/41; 701/42; 180/410; 180/443; 180/446

(58) Field of Classification Search
USPC ........... 701/41, 42, 43, 44; 180/410, 443, 446
See application file for complete search history.

(56) References Cited

U.S. PATENT DOCUMENTS

| 4,834,203 | A  | * | 5/1989  | Takahashi et al. ............ 180/446 |
| 5,828,972 | A  | * | 10/1998 | Asanuma et al. ............... 701/41 |
| 6,499,559 | B2 | * | 12/2002 | McCann et al. .............. 180/446 |
| 6,591,937 | B2 | * | 7/2003  | Badenoch et al. ............ 180/446 |
| 7,185,731 | B2 | * | 3/2007  | Farrelly et al. ................ 180/412 |
| 2004/0060765 | A1 |  | 4/2004  | Mattson |

FOREIGN PATENT DOCUMENTS

| DE | 19842439 A1 | 3/1999 |
| FR | 2804648 A1  | 8/2001 |

OTHER PUBLICATIONS

International Search Report PCT/FR2008/001010; Mar. 19, 2009.

* cited by examiner

*Primary Examiner* — Thomas Black
*Assistant Examiner* — Peter D Nolan
(74) *Attorney, Agent, or Firm* — Cantor Colburn LLP

(57) ABSTRACT

The steering system of the invention includes a processing means (26) comprising a means for determining (30) a driving signal (S3) of the power means (25) on the basis of: a first control signal (S1) determined from the measure of a torque applied by the driver on the steering wheel by applying a gain that depends on the longitudinal speed of the vehicle; a second correction signal (S2) determined from the measure of the torque applied by the driver on the steering wheel, and a setpoint determined on the basis of at least one characteristic parameter of the lateral dynamics of the vehicle.

6 Claims, 2 Drawing Sheets

POWER STEERING DEVICE FOR AUTOMOBILE

The present invention relates to a power steering system for a motor vehicle.

FIG. 1 provides a reminder of the main elements that make up a power steering system, for example an electric power steering system, of a motor vehicle. Such a steering system comprises, on the one hand, a mechanical part comprising a steering wheel 2 connected for rotation to a steering column 3 of which the end furthest from the steering wheel 2 carries a steering pinion in mesh with a rack 4, slidably mounted in a steering box 5. The two opposite ends of the rack 4 are connected respectively, by links 6 and 7, to the right and left (not depicted) steered wheels of the vehicle. The steering comprises, to assist with the manual force applied by the driver of the vehicle to the steering wheel 2, a power steering electric motor 8 with two directions of rotation. The output shaft of the power steering motor is coupled, via a speed reducer 9, notably of the worm and worm wheel type, or the type with a gear train, to the steering column 3 or to the steering pinion or to the rack 4 directly, so as to transmit a driving torque (and possibly also a resistive torque) to this element. The power steering electric motor 8 is driven by an onboard electronic computer 10 which receives and processes various signals sent by sensors.

In a conventional embodiment, the electronic computer 10 notably receives an electric signal from the torque sensor 11 positioned on the steering column 3, and which thus measures the torque applied by the driver to the steering wheel 2, and an electric signal from a vehicle speed sensor 12.

From these various items of information, the electronic computer 10 drives the power steering electric motor 8 by defining, at every moment, a power steering torque or force that may amplify or, on the other hand, compensate the force applied by the driver to the steering wheel 2, according to predefined "power assistance laws".

It should be noted that the predefined "power assistance laws" do not take into account parameters external to the power steering system and which influence the dynamics of the vehicle, such as, for example, the type and state (wear, inflation, age) of the vehicle tires.

Now, it should be noted that, for one and the same driving situation (the same corner, the same speed, the same weather conditions), the feel experienced by a driver of a vehicle, that is to say the torque that has to be applied by the driver to the steering wheel in order to turn the latter, differs according to the abovementioned external parameters.

What this means is that the feel experienced by the driver may be consistent with the driving situation as a result of the influence of these external parameters.

It is therefore desirable for the "power assistance laws" to take into consideration additional parameters which exactly represent the driving situation and the state of the moving vehicle.

The incorporation of such parameters must not in any way, in the manner in which the power assistance motor is driven, lead to any instabilities that could jeopardize the safety of the driver and passengers of the vehicle.

The technical problem addressed by the invention is therefore that of providing a power steering system that is able to keep the feel experienced by the driver of a vehicle equipped with this system consistent with the dynamics of the vehicle while at the same time not jeopardizing the safety of the latter.

To this end, the present invention relates to a power steering system for a motor vehicle, comprising:

- torque measurement means designed to measure the torque applied by a driver to the steering wheel of the motor vehicle,
- speed measurement means designed to measure the longitudinal speed of the motor vehicle,
- power assistance means designed to assist with the manual force applied by the driver of the vehicle to the steering wheel,
- processing means designed to drive the power assistance means, characterized in that the processing means comprise determining means for determining a driving signal for driving the power assistance means as a function:

- of a first, control, signal determined as a function of the measurement of the torque applied by the driver to the steering wheel by applying a gain that is dependent on the longitudinal speed of the vehicle,
- of a second, correction, signal determined as a function of:
  - the measurement of the torque applied by the driver to the steering wheel, and
  - a setpoint value determined as a function of at least one parameter characteristic of the lateral dynamics of the vehicle, the means of determining the driving signal that drives the power assistance means limiting the extent to which the second, correction, signal is taken into consideration so as to keep the driving signal within a defined interval about the value of the first, control, signal.

Determining the driving signal of the power assistance means on the basis notably of the setpoint value, allows the power assistance force to be controlled in such a way as to cause the feel experienced by the driver to tend toward the setpoint value which, for example, corresponds to a feel normally desired by a driver in this dynamic situation of the vehicle.

The present invention also makes it possible for the power assistance force to be adapted in such a way as to control the feel experienced by the driver as a function of the lateral dynamic state of the vehicle. This measure allows variations in external parameters, such as, for example, the type and state of the tires to be taken into consideration, because these alter the vehicle dynamics.

Taking the control signal and the correction signal into consideration means that it is possible both to enjoy a feel that corresponds to the dynamic conditions and to maintain a reference control signal that represents a safe mode of operation, it being possible for the determining means to select or combine the first and second signal according to the driving situation and the consistency of the proposed setpoint value with this situation.

In addition, the fact that the means of determining the driving signal that drives the power assistance means limit the incorporation of the second, correction, signal so as to keep the driving signal within a defined interval about the value of the first, control, signal means that the incorporation of a setpoint value that could lead to instability in the driving of the power assistance means liable to jeopardize the safety of the driver and passengers of the vehicle can be limited.

Advantageously, the width of the interval is defined as a percentage of the value of the first, control, signal.

According to one embodiment of the invention, the second, correction, signal is determined as a function of the difference between the measurement of the torque applied by the driver to the steering wheel and the setpoint value determined as a function of at least one parameter characteristic of the lateral dynamics of the vehicle.

According to another embodiment of the invention, the system comprises a component designed to determine the setpoint value as a function of at least one parameter characteristic of the lateral dynamics of the vehicle.

According to yet another embodiment of the invention, the setpoint value is further determined as a function of at least one parameter characteristic of the vertical and/or longitudinal dynamics of the vehicle.

In any event, the invention will be clearly understood with the aid of the description which follows, with reference to the attached schematic drawing which, by way of nonlimiting example, depicts one embodiment of this electric power assisted steering system.

FIG. 2 represents an electric power steering system 21 of a motor vehicle, comprising:

Figure 1:
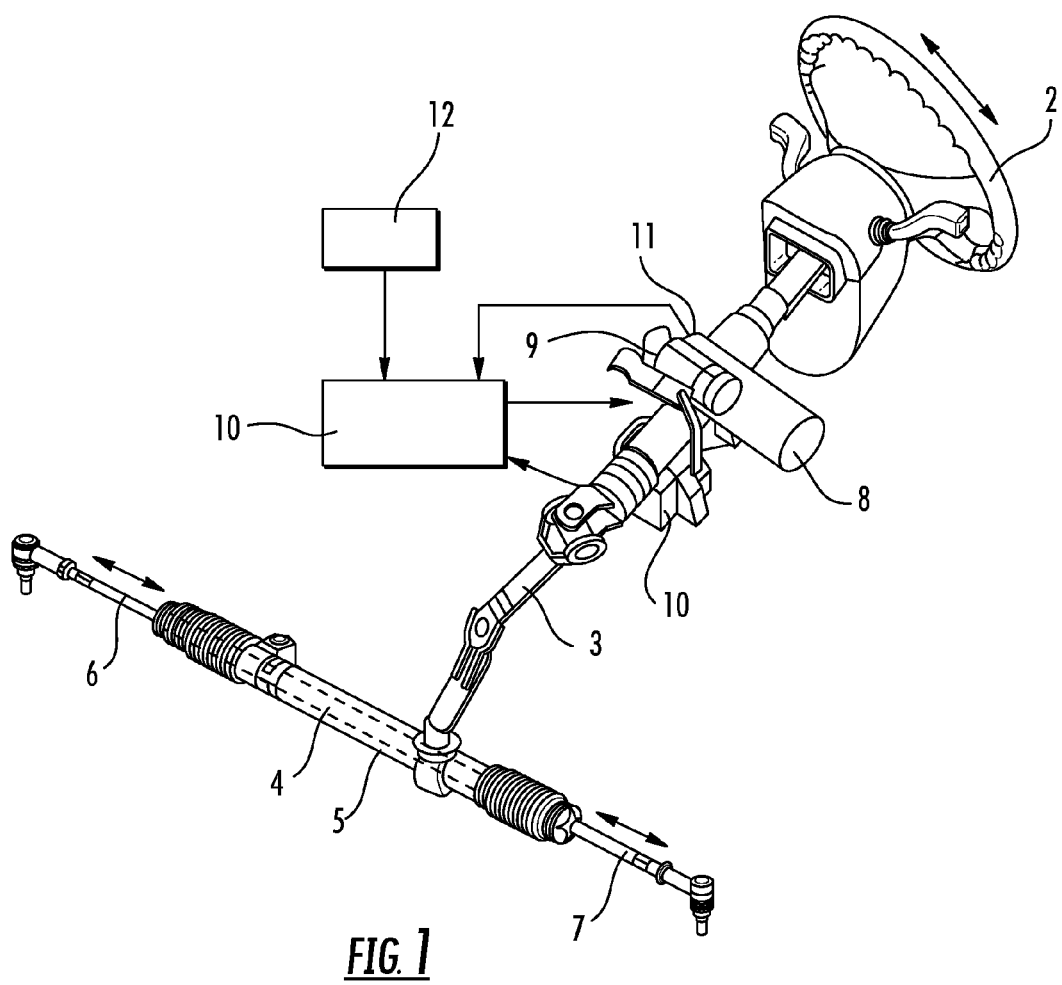
FIG. 1 is a schematic perspective view of an electrical power steering system on a conventional steering column.
Figure 2:
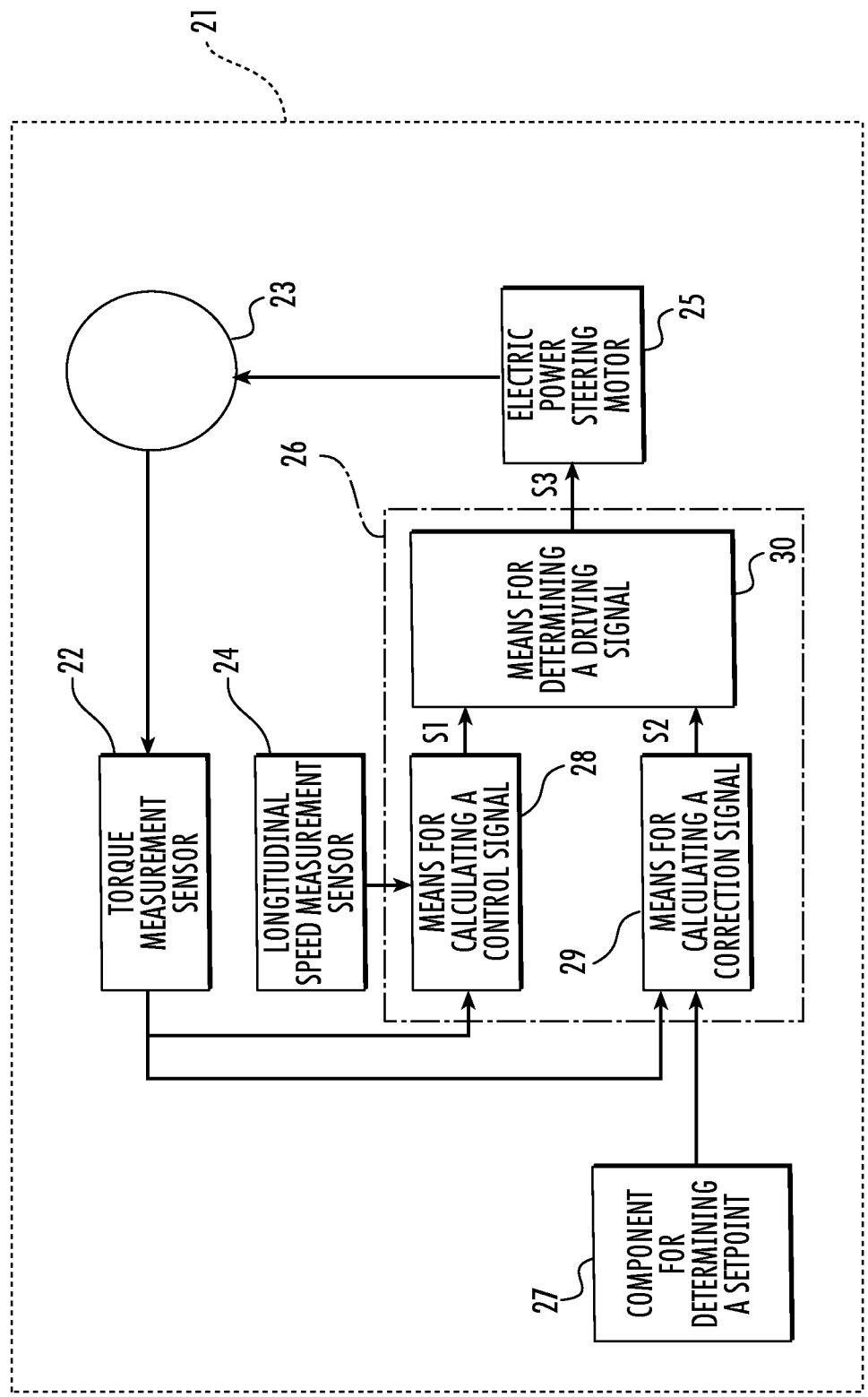
FIG. 2 is a schematic part view of an electric power steering system according to the invention.

- a torque measurement sensor 22 designed to measure the torque applied by a driver to the steering wheel 23 of the motor vehicle,
- a speed measurement sensor 24 designed to measure the longitudinal speed of the motor vehicle,
- an electric power steering motor 25 designed to assist with the manual force applied by the driver of the vehicle to the steering wheel 23,
- a processing unit 26 designed to drive the electric power steering motor,
- a component 27 designed to determine a setpoint value as a function of at least one parameter characteristic of the lateral, longitudinal and vertical dynamics of the vehicle.

The processing unit 26 comprises:

- first calculating means 28 of calculating a first, control, signal S1 determined as a function of the measurement of the torque applied by the driver to the steering wheel 23 by applying a gain dependent on the longitudinal speed of the vehicle,
- second calculating means 29 for calculating a second, correction, signal S2 determined as a function of the difference between the measurement of the torque applied by the driver to the steering wheel and the setpoint value determined as a function of at least one parameter characteristic of the lateral, longitudinal and vertical dynamics of the vehicle,
- determining means 30 for determining a driving signal S3 for driving the power steering motor as a function of the first, control, signal and of the second, correction, signal.

The means of determining the driving signal for driving the power steering motor 25 limit the extent to which the second, correction, signal is taken into consideration so as to keep the driving signal within a defined interval about the value of the first, control, signal.

The width of the interval is defined, for example, as a percentage of the value of the first, control, signal.

It must be noted that the parameters characteristic of the lateral dynamics of the vehicle may be the lateral speed, the lateral acceleration and the derivative of the lateral acceleration, or any other characteristic ultimately enabling the lateral speed, the lateral acceleration and the derivative of lateral acceleration to be determined.

It should also be noted that the parameters characteristic of the longitudinal dynamics of the vehicle may be the longitudinal speed, the longitudinal acceleration, the derivative of longitudinal acceleration, the longitudinal speeds and acceleration of the wheels of the vehicles, or any other characteristic making it possible ultimately to determine the longitudinal speed, the longitudinal acceleration and the derivative of longitudinal acceleration.

It should be specified that the parameters characteristic of the vertical dynamics of the vehicle may be the vertical speed, the vertical acceleration, the derivative of the vertical acceleration or any other characteristic ultimately enabling the vertical speed, the vertical acceleration and the derivative of vertical acceleration to be determined.

The parameters characteristic of the lateral, longitudinal and vertical dynamics may also be the steering wheel angle, the steering rate, the steering acceleration, the yaw rate and the yaw acceleration of the vehicle, the torque supplied by the vehicle engine.

According to one embodiment of the invention, the first and second calculating means and the determining means may consist of electronic or software functions installed in one and the same processor or in separate processors.

It goes without saying that the invention is not restricted merely to the one embodiment of this power steering system that has been described hereinabove by way of example, but on the contrary encompasses all alternative forms of embodiment thereof. Thus, in particular, the power steering system could be an electrohydraulic power steering system or a controlled hydraulic power steering system.

The invention claimed is:

1. A power steering system for a motor vehicle, comprising:
    a torque sensor designed to measure torque applied by a driver to a steering wheel of the motor vehicle,
    a speed sensor designed to measure longitudinal speed of the motor vehicle,
    a steering motor designed to assist with manual force applied by the driver of the vehicle to the steering wheel,
    a processing unit designed to drive the motor, wherein the processing unit comprise determining electronic or software functions in one processor or in separate processors for determining a driving signal for driving the motor as a function:
        of a first control signal determined as a function of the measurement of torque applied by the driver to the steering wheel by applying a gain that is dependent on the longitudinal speed of the vehicle,
        of a second correction signal determined as a function of:
            the measurement of the torque applied by the driver to the steering wheel, and
            a setpoint value determined as a function of at least one parameter characteristics of lateral dynamics of the vehicle, said setpoint value corresponding to a feel desired by a driver in a dynamic situation of the vehicle,
    wherein the electronic or software functions for determining the driving signal that drives the steering motor limits the extent to which the second correction signal is taken into consideration so as to keep the driving signal within a defined interval about a value of the first control signal and
    wherein the second correction signal is determined as a function of a difference between the measurement of the torque applied by the driver to the steering wheel and the setpoint value determined as a function of at least one parameter characteristic of the lateral dynamics of the vehicle.

2. The system as claimed in claim 1, in which a width of the interval is defined as a percentage of a value of the first control signal.

3. The system as claimed in claim 1, comprising a component designed to determine the setpoint value as the function of the at least one parameter characteristic of the lateral dynamics of the vehicle.

4. The system as claimed in claim 1, in which the setpoint value is further determined as a function of at least one parameter characteristic of the vertical and/or longitudinal dynamics of the vehicle.

5. A method for driving a power steering system of a motor vehicle comprising an electric power steering motor designed to assist with manual force applied by a driver of the vehicle to a steering wheel, said method comprising:
   measuring a torque applied by a driver to the steering wheel of the motor vehicle,
   measuring a longitudinal speed of the motor vehicle,
   determining a driving signal for driving the motor as a function:
      of a first control signal determined as a function of the measurement of torque applied by the driver to the steering wheel by applying a gain that is dependent on the longitudinal speed of the vehicle,
      of a second correction signal determined as a function of:
         the measurement of the torque applied by the driver to the steering wheel, and
         a setpoint value determined as a function of at least one parameter characteristics of lateral dynamics of the vehicle, said setpoint value corresponding to a feel desired by a driver in a dynamic situation of the vehicle,
   the second correction signal being determined as a function of a difference between the measurement of the torque applied by the driver to the steering wheel and the setpoint value determined as the function of at least one parameter characteristic of the lateral dynamics of the vehicle, and
   limiting the extent to which the second correction signal is taken into consideration so as to keep the driving signal within a defined interval about a value of the first control signal.

6. A method for driving a power steering system of a motor vehicle comprising an electric power steering motor designed to assist with manual force applied by a driver of the vehicle to a steering wheel, said method comprising:
   measuring a torque applied by a driver to the steering wheel of the motor vehicle,
   measuring a longitudinal speed of the motor vehicle,
   determining a driving signal for driving the motor as a function:
      of a first control signal determined as a function of the measurement of torque applied by the driver to the steering wheel by applying a gain that is dependent on the longitudinal speed of the vehicle,
      of a second correction signal determined as a function of:
         the measurement of the torque applied by the driver to the steering wheel, and
         a setpoint value determined as a function of at least one parameter characteristics of lateral dynamics of the vehicle, said setpoint value corresponding to a feel desired by a driver in a dynamic situation of the vehicle,
   the second correction signal being determined as a function of a difference between the measurement of the torque applied by the driver to the steering wheel and the setpoint value determined as the function of at least one parameter characteristic of the lateral dynamics of the vehicle.

* * * * *